US012736903B2

(12) United States Patent
Odaka

(10) Patent No.: US 12,736,903 B2
(45) Date of Patent: Sep. 15, 2026

(54) IMAGE FORMING APPARATUS AND STORAGE METHOD CAPABLE OF SUPPRESSING OCCURRENCE OF HIGH-TEMPERATURE OFFSET

(71) Applicant: KYOCERA Document Solutions Inc., Osaka (JP)

(72) Inventor: Yoshiyuki Odaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/210,323

(22) Filed: May 16, 2025

(65) Prior Publication Data

US 2025/0355387 A1 Nov. 20, 2025

(30) Foreign Application Priority Data

May 17, 2024 (JP) ................................ 2024-080642

(51) Int. Cl.
*G03G 15/20* (2006.01)

(52) U.S. Cl.
CPC ................... *G03G 15/2046* (2013.01); *G03G 2215/00734* (2013.01)

(58) Field of Classification Search
CPC ........................... G03G 15/20; G03G 15/2046
USPC ..................................................... 399/67, 69
See application file for complete search history.

(56) References Cited

FOREIGN PATENT DOCUMENTS

JP 4786776 B2 * 10/2011 ......... H04N 1/00427
JP 2013182153 A 9/2013

* cited by examiner

*Primary Examiner* — Hoan H Tran
(74) *Attorney, Agent, or Firm* — Alleman Hall LLP

(57) ABSTRACT

An image forming apparatus includes a first storage processing portion, a second storage processing portion, a third storage processing portion, and a fourth storage processing portion. The first storage processing portion stores, in a volatile first storage portion, width size information corresponding to a width of a sheet in contact with a fixing portion. The second storage processing portion stores, in a non-volatile second storage portion, the width size information last stored in the first storage portion before power supply to the first storage portion is stopped. The third storage processing portion stores, in the first storage portion, the width size information last stored in the second storage portion after power supply to the first storage portion is restarted. The fourth storage processing portion stores, in the second storage portion, the width size information corresponding to a predetermined size after processing by the third storage processing portion.

4 Claims, 7 Drawing Sheets

IMAGE FORMING APPARATUS AND STORAGE METHOD CAPABLE OF SUPPRESSING OCCURRENCE OF HIGH-TEMPERATURE OFFSET

INCORPORATION BY REFERENCE

This application is based upon and claims the benefit of priority from the corresponding Japanese Patent Application No. 2024-080642 filed on May 17, 2024, the entire contents of which are incorporated herein by reference.

BACKGROUND

The present disclosure relates to an image forming apparatus and a storage method.

An electrophotographic image forming apparatus includes a fixing portion such as a fixing belt that fixes a toner image transferred onto a sheet to the sheet. In this type of image forming apparatus, when an image is formed on a sheet having a size in the width direction that is smaller than a predetermined reference size, an outer side of a contact area with the sheet in the fixing portion may become excessively hot. In this state, when an image is formed on a sheet with a larger size in the width direction, a defect called high-temperature offset occurs, in which some toner included in a toner image transferred to the sheet is transferred to a subsequent sheet via an excessively heated area in the fixing portion. In response to this, an image forming apparatus is known that prohibits an image forming operation and executes a temperature lowering process to reduce the temperature of the fixing portion when the size in the width direction of the sheet on which the next image is to be formed is larger than the size in the width direction of the sheet on which the previous image was formed.

SUMMARY

An image forming apparatus according to a first aspect of the present disclosure includes: a fixing portion, a first storage processing portion, a determination processing portion, a second storage processing portion, a third storage processing portion, and a fourth storage processing portion. The fixing portion fixes the toner image transferred onto the sheet to the sheet. The first storage processing portion stores in a volatile first storage portion width size information corresponding to a size in a width direction of a sheet perpendicular to a conveying direction of the sheet after the sheet has passed a fixing position of the toner image by the fixing portion. The determination processing portion, using the width size information last stored in the first storage portion, determines, in a case in which an image forming process for forming an image on the sheet is executed, whether or not a temperature lowering process for lowering a temperature of the fixing portion is necessary. The second storage processing portion, in a case in which power supply to the first storage portion is stopped, stores the width size information last stored in the first storage portion in a non-volatile second storage portion. The third storage processing portion, in a case in which power supply to the first storage portion is started, stores, in the first storage portion, the width size information that was last stored in the second storage portion. The fourth storage processing portion, after the width size information is stored by the third storage processing portion, stores, in the second storage portion, the width size information corresponding to the size in the width direction of the sheet having a minimum size in the width direction among the sheets on which an image can be formed by the image forming apparatus.

The storage method according to another aspect according to the present disclosure is executed by an image forming apparatus including a fixing portion that fixes a toner image transferred onto a sheet to the sheet and includes: a first storage step, a determination step, a second storage step, the third storage step, and a fourth storage step. In the first storage step, width size information corresponding to a size in a width direction of a sheet perpendicular to a conveying direction of the sheet after the sheet has passed a fixing position of the toner image by the fixing portion is stored in a volatile first storage portion. In the determination step, in a case in which an image forming process for forming an image on the sheet is executed, whether or not a temperature lowering process for lowering a temperature of the fixing portion is necessary is determined using the width size information last stored in the first storage portion. In the second storage step, in a case in which power supply to the first storage portion is stopped, the width size information last stored in the first storage portion is stored in a non-volatile second storage portion. In the third storage step, in a case in which power supply to the first storage portion is started, the width size information that was last stored in the second storage portion is stored in the first storage portion. In the fourth storage step, after the width size information is stored by the third storage processing portion, the width size information corresponding to the size in the width direction of the sheet having a minimum size in the width direction among the sheets on which an image can be formed by the image forming apparatus is stored in the second storage portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments according to the present disclosure will be described with reference to the accompanying drawings. Note that the following embodiments are examples that embody a technique according to the present disclosure, and do not limit the technical scope of the present disclosure.

[Configuration of Image Forming Apparatus 100]

First, a configuration of an image forming apparatus 100 of an embodiment according to the present disclosure will be described with reference to FIGS. 1 and 2.

Note that for ease of explanation, a vertical direction in an installed state in which the image forming apparatus 100 is usable (the state shown in FIG. 1) is defined as an up-down direction D1. In addition, a front-rear direction D2 is defined with the left side of the paper surface of the image forming apparatus 100 shown in FIG. 1 being the front (front surface). Moreover, a left-right direction D3 is defined based on the front of the image forming apparatus 100 in the installed state.

The image forming apparatus 100 is a multifunction peripheral having multiple functions, such as a scanning function for reading an image of an document sheet, a printing function for forming an image based on image data, a fax function, and a copy function. Note that the present disclosure may be applied to image forming apparatuses such as printers, fax machines, and copiers.

Figure 1:
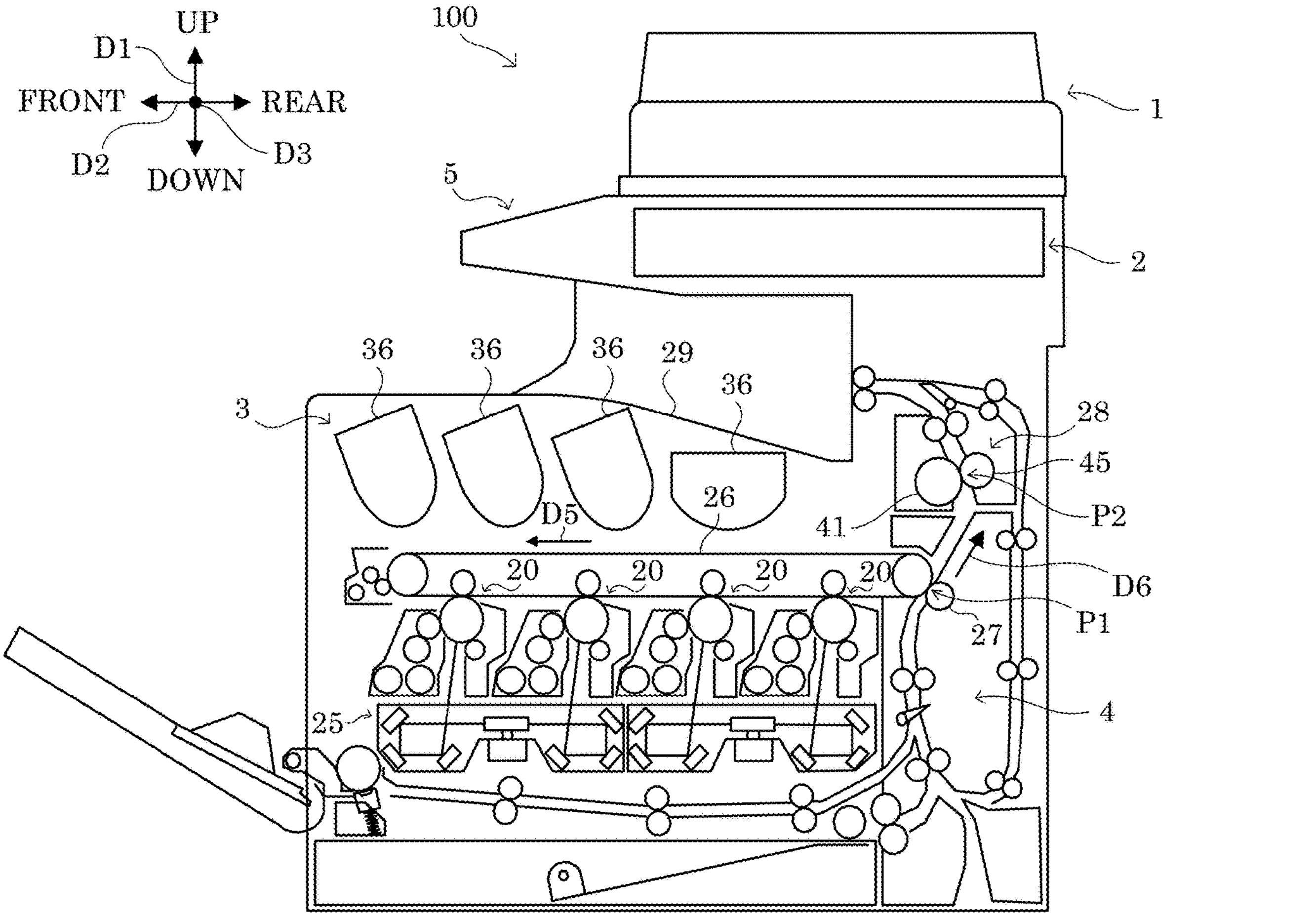
FIG. 1 is a cross-sectional view showing a configuration of an image forming apparatus of an embodiment according to the present disclosure.
Figure 2:
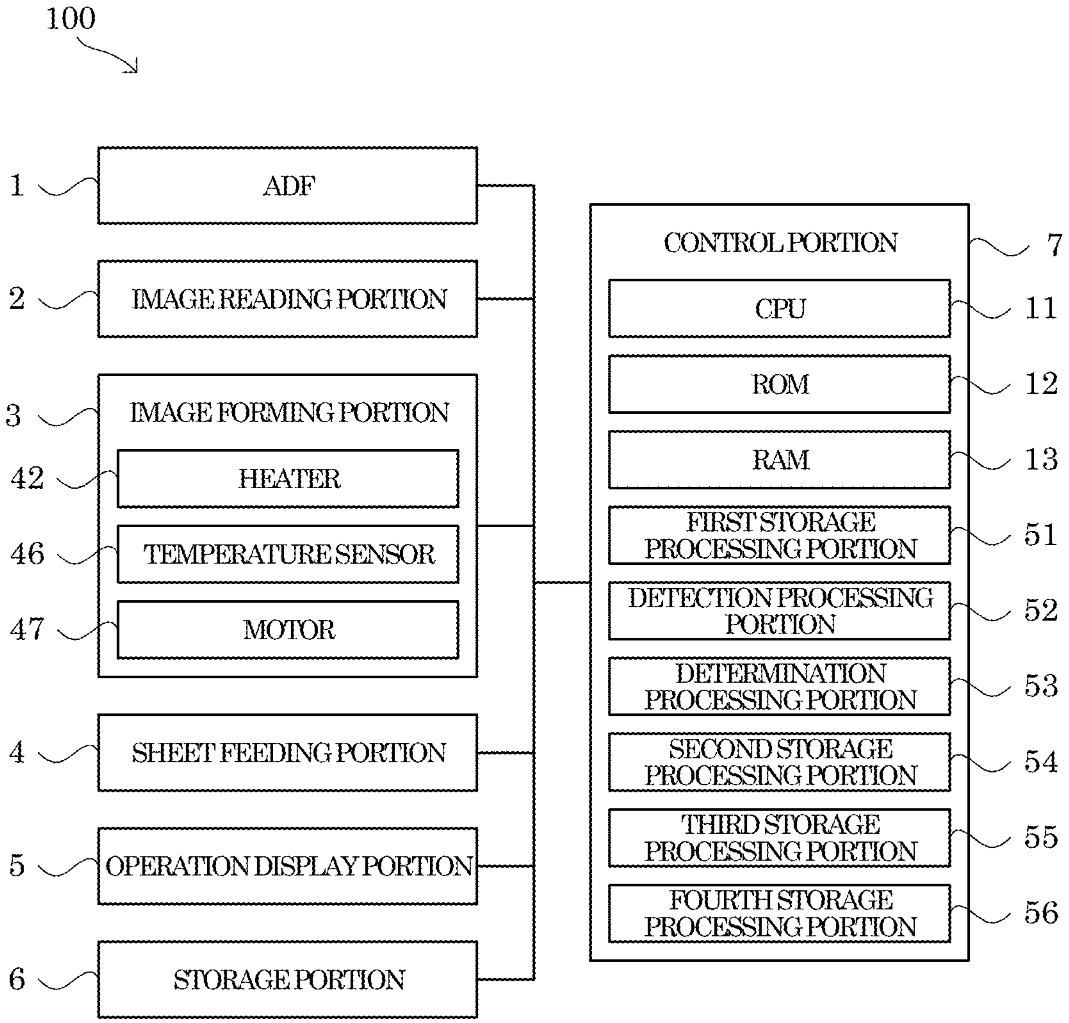
FIG. 2 is a block diagram showing a system configuration of an image forming apparatus of an embodiment according to the present disclosure.

As shown in FIGS. 1 and 2, the image forming apparatus 100 includes an auto document feeder (ADF) 1, an image reading portion 2, an image forming portion 3, a sheet feeding portion 4, an operation display portion 5, a storage portion 6, and a control portion 7.

The ADF 1 conveys an document sheet to be read by the scanning function. The ADF 1 includes a document sheet setting portion, a plurality of conveying rollers, a document sheet holder, and a sheet discharge portion.

The image reading portion 2 implements the scanning function. The image reading portion 2 includes a document sheet table, a light source, a plurality of mirrors, an optical lens, and a charge coupled device (CCD).

The image forming portion 3 implements the printing function. More specifically, the image forming portion 3 forms a color or monochrome image on a sheet supplied from the sheet feed portion 4 according to an electrophotographic method.

The sheet feed portion 4 supplies sheets to the image forming portion 3. The sheet feed portion 4 includes a sheet feed cassette, a manual feed tray, and a plurality of conveying rollers.

The operation display portion 5 is a user interface of the image forming apparatus 100. The operation display portion 5 has a display portion such as a liquid-crystal display that displays various types of information in response to control instructions from the control portion 7, and an operation portion such as operation keys or a touch panel that inputs various types of information to the control portion 7 in response to user operations.

The storage portion 6 is a non-volatile storage device. For example, the storage portion 6 is a flash memory. The storage portion 6 is an example of a second storage portion according to the present disclosure.

The control portion 7 performs overall control of the image forming apparatus 100. As shown in FIG. 2, the control portion 7 includes a CPU 11, a ROM 12, and a RAM 13. The CPU 11 is a processor that executes various types of arithmetic processing. The ROM 12 is a non-volatile storage device in which information such as control programs for causing the CPU 11 to execute various types of processes is stored in advance. The RAM 13 is a volatile storage device used as a temporary storage memory (work area) for various types of processes executed by the CPU 11. The CPU 11 performs overall control of the image forming apparatus 100 by executing various types of control programs prestored in the ROM 12. The RAM 13 is an example of a first storage portion according to the present disclosure.

Note that the control portion 7 may be a control portion provided separately from a main control portion that performs overall control of the image forming apparatus 100. In addition, the control portion 7 may also be configured with an electronic circuit such as an integrated circuit (ASIC).

[Configuration of Image Forming Portion 3]

Next, a configuration of the image forming portion 3 will be described with reference to FIGS. 1 to 3. Here, FIG. 3 is a cross-sectional view showing a configuration of a plurality of image forming units 20, the intermediate transfer belt 26, and the secondary transfer roller 27.

As shown in FIG. 1, the image forming portion 3 includes four image forming units 20, a laser scanning unit 25, an intermediate transfer belt 26, a secondary transfer roller 27, a fixing device 28, and a sheet discharge tray 29.

Of the four image forming units 20, the image forming unit 21 (see FIG. 3) forms a yellow (Y) toner image. Of the four image forming units 20, the image forming unit 22 (see FIG. 3) forms a cyan (C) toner image. Of the four image forming units 20, the image forming unit 23 (see FIG. 3) forms a magenta (M) toner image. Of the four image forming units 20, the image forming unit 24 (see FIG. 3) forms a black (K) toner image. That is, the image forming portion 3 forms an image on a sheet using each of the CMYK toners. As shown in FIGS. 1 and 3, the four image forming units 20 are arranged side by side in the order of yellow, cyan, magenta, and black from the front side of the image forming apparatus 100 along the front-rear direction D2.

Figure 3:
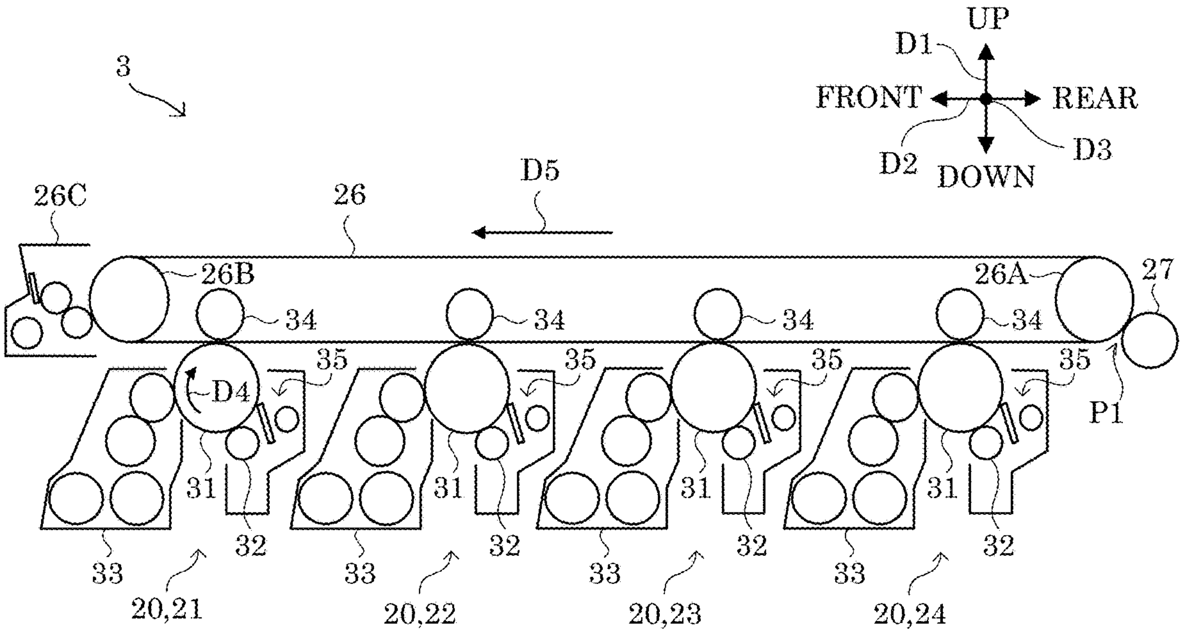
FIG. 3 is a cross-sectional view showing a configuration of an image forming portion of an image forming apparatus of an embodiment according to the present disclosure.

As shown in FIG. 3, each image forming unit 20 includes a photoconductor drum 31, a charging roller 32, a developing device 33, a primary transfer roller 34, and a drum cleaning portion 35. In addition, each of the image forming units 20 also includes a toner container 36 shown in FIG. 1.

An electrostatic latent image is formed on a surface of the photoconductor drum 31. For example, the photoconductor drum 31 has a photosensitive layer made of amorphous silicon. The photoconductor drum 31 receives a rotational driving force supplied from a motor (not shown) and rotates in a rotational direction D4 shown in FIG. 3. Thus, the photoconductor drum 31 conveys the electrostatic latent image formed on the surface.

The charging roller 32 is applied with a preset charging voltage to charge the surface of the photoconductor drum 31. For example, the charging roller 32 charges the surface of the photoconductor drum 31 to a positive polarity. The surface of the photoconductor drum 31 charged by the charging roller 32 is irradiated with light based on image data emitted from the laser scanning unit 25. Thus, an electrostatic latent image is formed on the surface of the photoconductor drum 31.

The developing device 33 develops the electrostatic latent image formed on the surface of the photoconductor drum 31.

The developing device 33 includes a pair of stirring members, a magnetic roller, and a developing roller. The pair of stirring members stir developing agent contained inside the developing device 33. The developing agent includes a toner and a carrier. Thus, the toner contained in the developing agent is charged to have a positive polarity due to friction with the carrier contained in the developing agent. The magnetic roller picks up the developing agent stirred by the pair of stirring members, and supplies the toner contained in the developing agent to the developing roller. The developing roller conveys the toner supplied from the magnetic roller to a position facing the photoconductor drum 31. In addition, the developing roller receives a preset developing bias voltage and supplies the toner conveyed to the opposing position to the photoconductor drum 31. Thus, the electrostatic latent image formed on the surface of the photoconductor drum 31 is visualized (developed). The developing device 33 is supplied with toner from a toner container 36.

The primary transfer roller 34 is supplied with a preset primary transfer current, and transfers the toner image formed on the surface of the photoconductor drum 31 onto an outer peripheral surface of the intermediate transfer belt 26. As shown in FIG. 3, the primary transfer roller 34 is provided opposite the photoconductor drum 31 with the intermediate transfer belt 26 interposed therebetween.

The drum cleaning portion 35 removes the toner remaining on the surface of the photoconductor drum 31 after the toner image has been transferred by the primary transfer roller 34.

The laser scanning unit 25 emits light based on image data toward the surface of the photoconductor drum 31 of each image forming unit 20.

The intermediate transfer belt 26 is an endless belt member onto which toner images formed on the surfaces of the photoconductor drums 31 of the image forming units 20 are transferred. The intermediate transfer belt 26 is stretched with a predetermined tension by a drive roller 26A (see FIG. 3) and a tension roller 26B (see FIG. 3). The intermediate transfer belt 26 rotates in a rotation direction D5 shown in FIG. 3 as the drive roller 26A rotates upon receiving a rotational driving force supplied from a motor (not shown). Thus, the intermediate transfer belt 26 conveys the toner image formed on the outer peripheral surface to a secondary transfer position P1 (see FIG. 3) where the secondary transfer roller 27 transfers the toner image. Note that after the toner image is transferred by the secondary transfer roller 27, the outer peripheral surface of the intermediate transfer belt 26 is cleaned by the belt cleaning device 26C shown in FIG. 3.

The secondary transfer roller 27 is supplied with a preset secondary transfer current, and transfers the toner image transferred onto the outer peripheral surface of the intermediate transfer belt 26 onto a sheet supplied from the sheet feed portion 4. As shown in FIG. 3, the secondary transfer roller 27 is provided opposite the drive roller 26A with the intermediate transfer belt 26 therebetween. The secondary transfer roller 27 is pressed toward the drive roller 26A by a pressing member (not shown) so as to come into contact with the intermediate transfer belt 26 with a predetermined nip pressure. The secondary transfer roller 27 transfers the toner image formed on the intermediate transfer belt 26 onto a sheet at a secondary transfer position P1 (see FIG. 3) where the secondary transfer roller 27 comes into contact with the intermediate transfer belt 26. The sheet onto which the toner image has been transferred at the secondary transfer position P1 is conveyed in a conveying direction D6 (see FIG. 1) toward a fixing position P2 (see FIG. 1).

The fixing device 28 fixes the toner image transferred onto the sheet by the secondary transfer roller 27 to the sheet.

The sheet on which the toner image has been fixed by the fixing device 28 is discharged to a sheet discharge tray 29.

[Configuration of Fixing Device 28]

Next, a configuration of the fixing device 28 will be described with reference to FIGS. 2, 4, and 5.

Figure 4:
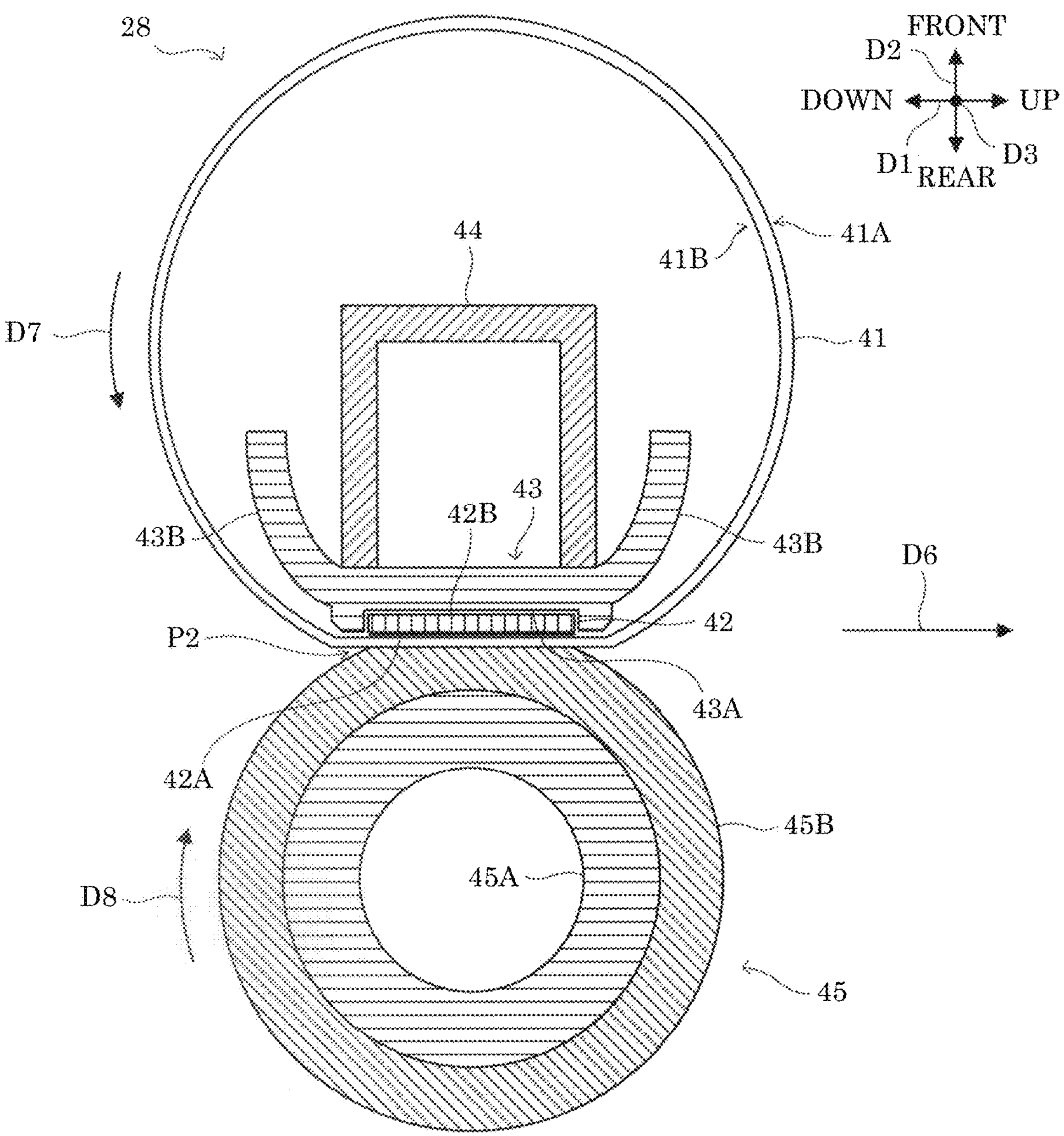
FIG. 4 is a cross-sectional view showing a configuration of a fixing device of an image forming apparatus of an embodiment according to the present disclosure.

As shown in FIG. 4, the fixing device 28 includes a fixing belt 41, a heater 42, a heater support portion 43, a pressing member 44, and a pressure roller 45. In addition, as shown in FIG. 2, the fixing device 28 also includes a temperature sensor 46 and a motor 47.

The fixing belt 41 fixes the toner image transferred onto the sheet to the sheet. The fixing belt 41 is an example of a fixing portion according to the present disclosure. Note that the fixing portion according to the present disclosure may be a member having a shape different from that of a belt, such as a fixing roller.

As shown in FIG. 4, the fixing belt 41 is a member formed in a shape of an endless belt. The fixing belt 41 is flexible. The fixing belt 41 is sandwiched between a heater 42 and a pressure roller 45, and runs along a running direction D7 (see FIG. 4) following the rotation of the pressure roller 45. The sheet onto which the toner image has been transferred is heated and pressed when passing through a fixing position P2 (see FIG. 4) where the toner image is fixed by the fixing belt 41. Thus, the toner image transferred onto the sheet is fixed to the sheet. Fixing position P2 is a position where the fixing belt 41 and the pressure roller 45 come into contact with each other.

The heater 42 heats the fixing belt 41.

The heater 42 is formed in a flat plate shape extending in the left-right direction D3. The heater 42 is provided in contact with an inner peripheral surface 41B of the fixing belt 41 (see FIG. 4).

Figure 5:
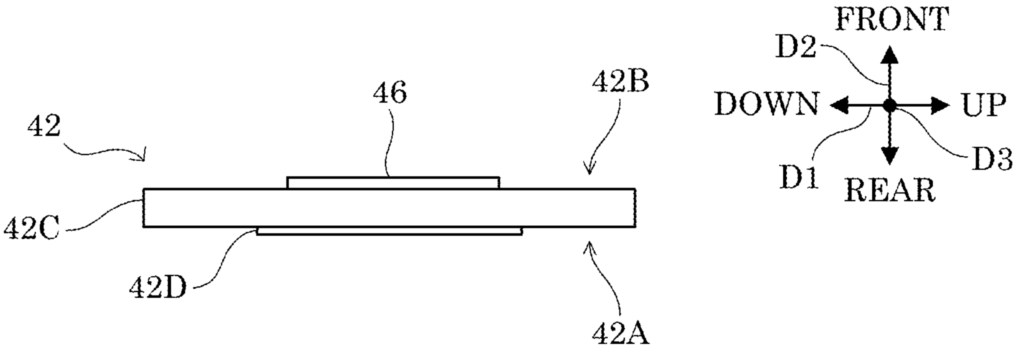
FIG. 5 is a side view showing a configuration of a heater of an image forming apparatus of an embodiment according to the present disclosure.

As shown in FIG. 5, the heater 42 includes a substrate 42C and a resistive heating element 42D. The substrate 42C is formed in a flat plate shape extending in the left-right direction D3. The resistive heating element 42D is mounted on a first surface 42A (see FIG. 5) of the substrate 42C that contacts the inner peripheral surface 41B of the fixing belt 41. The resistive heating element 42D is connected to a power supply (not shown) via a wiring pattern or the like mounted on the first surface 42A. The resistive heating element 42D generates heat when a current supplied from the power supply flows therethrough.

The heater 42 is provided opposite the pressure roller 45 with the fixing belt 41 therebetween. In addition, by pressing the heater 42 toward the pressure roller 45 side by the pressing member 44, the heater 42 is brought into pressure contact with the inner peripheral surface 41B of the fixing belt 41.

The heater support portion 43 supports the heater 42. As shown in FIG. 4, the heater support portion 43 is formed with a recess portion 43A into which the heater 42 can be fitted. The heater 42 is fitted into the recess portion 43 A of the heater support portion 43.

In addition, the heater support portion 43 guides the fixing belt 41 so that the fixing belt 41 runs along a predetermined running path. More specifically, the heater support portion 43 includes a pair of guide portions 43B (see FIG. 4) that contact the inner peripheral surface 41B of the fixing belt 41 and guide the fixing belt 41.

The pressing member 44 presses the heater support portion 43 towards the pressure roller 45 side. The pressing member 44 is provided in contact with the heater support portion 43 and is elongated in the left-right direction D3, which is the width direction of the fixing belt 41. In addition, both ends in the longitudinal direction of the pressing member 44 receive a pressing force from a pressing member (not shown) in a direction toward the pressure roller 45 side. Thus, the pressing member 44 presses the heater support portion 43 towards the pressure roller 45 side. When the heater support portion 43 is pressed toward the pressure roller 45 side, the heater 42 supported by the heater support portion 43 is also pressed toward the pressure roller 45 side.

The pressure roller 45 is provided in contact with the outer peripheral surface 41A of the fixing belt 41. The pressure roller 45 includes a metal shaft portion 45A and an elastic layer 45B having elasticity formed on the outer periphery of the shaft portion 45A. The shaft portion 45A is rotatably supported by a pair of side plates provided inside a housing of the image forming apparatus 100. The pressure roller 45 receives a rotational driving force supplied from the motor 47 and rotates in a rotational direction D8 (see FIG. 4).

The temperature sensor 46 detects the temperature of the heater 42.

As shown in FIG. 5, the temperature sensor 46 is provided on a second surface 42B of the heater 42 on a rear side of the first surface 42A. For example, the temperature sensor 46 is an electrical circuit including a thermistor, and outputs an electrical signal according to the temperature at the installation position. The electrical signal output from the temperature sensor 46 is input to the control portion 7.

The motor 47 supplies a rotational driving force to the pressure roller 45.

In the image forming apparatus 100, in a case in which an image is formed on a sheet having a size in the width direction that is smaller than a predetermined reference size, the temperature of the fixing belt 41 outside the contact area with the sheet may become excessively high. In this state, when an image is formed on a sheet having a larger size in the width direction, a defect called high-temperature offset occurs, in which part of the toner contained in the toner image transferred to the sheet is transferred to the subsequent sheet via an excessively heated area of the fixing belt 41. In response to this, an image forming apparatus is known that prohibits an image forming operation and executes a temperature lowering process to reduce the temperature of the fixing belt 41 when the size in the width direction of the sheet on which the next image is to be formed is larger than the size in the width direction of the sheet on which the previous image was formed.

Note that in the present embodiment, the width direction is the same as the left-right direction D3. In addition, in the present embodiment, the reference size is the size in the width direction of a sheet that has the largest size in the width direction among sheets on which an image can be formed in the image forming apparatus 100. Note that the reference size may be a size smaller than the size in the width direction of a sheet that has the maximum size in the width direction among sheets on which an image can be formed in the image forming apparatus 100.

Here, in a configuration in which determining whether or not the temperature lowering process is necessary is based on the results of comparing the size in the width direction of the sheet on which the next image is to be formed with the size in the width direction of the sheet on which an image was most recently formed, it is necessary to retain width size information corresponding to the size in the width direction of the sheet on which the last image was formed. The width size information is information that indicates the size in the width direction of the sheet. In response to this, a configuration can be considered in which, each time an image forming process is executed, the width size information corresponding to the size in the width direction of the sheet on which an image is formed in the image forming process is stored in the RAM 13, and when a power supply to the RAM 13 is stopped, the width size information last stored in the RAM 13 is stored in the storage portion 6.

However, in the configuration described above, in a case in which the power supply to the RAM 13 is stopped due to a power outage or the like before the width size information last stored in RAM 13 is stored in the storage portion 6 and then the power supply to the RAM 13 is resumed, the width size information last stored in storage portion 6 will be treated as the stored width size information. Therefore, when the next image forming process is executed, it may not be possible to correctly determine whether or not the temperature lowering process is required, and it may not be possible to suppress the occurrence of the high-temperature offset.

However, in the image forming apparatus 100 of an embodiment according to the present disclosure, the occurrence of the high-temperature offset can be suppressed as will be described below.

[Configuration of Control Portion 7]

Next, a configuration of the control portion 7 will be described with reference to FIG. 2.

As shown in FIG. 2, the control portion 7 includes a first storage processing portion 51, a detection processing portion 52, a determination processing portion 53, a second storage processing portion 54, a third storage processing portion 55, and a fourth storage processing portion 56.

More specifically, the ROM 12 of the control portion 7 stores in advance operation control programs for causing the CPU 11 to function as each of the above-mentioned processing portions. The CPU 11 executes the operation control programs stored in the ROM 12 to function as each of the above-mentioned processing portions.

The operation control program may be recorded on a computer-readable recording medium such as a CD, DVD, or flash memory, and may be read from the recording medium and stored in a storage device such as the storage portion 6. In addition, some or all of the processing portions included in the control portion 7 may be configured with electronic circuits. Moreover, the operation control program may be a program for causing a plurality of processors to function as each of the processing portions included in the control portion 7.

The first storage processing portion 51 stores in the RAM 13 the width size information corresponding to the size in the width direction crossing the conveying direction D6 (see FIG. 4) of the sheet that has passed through the fixing position P2 of the toner image by the fixing belt 41.

For example, the first storage processing portion 51 stores the width size information corresponding to a sheet in the RAM 13 every time the sheet passes through the fixing position P2. Note that in a case in which the image forming process is completed, the first storage processing portion 51 may store in the RAM 13 the width size information corresponding to the sheet that last passed through the fixing position P2.

For example, every time a sheet passes through the fixing position P2, the first storage processing portion 51 overwrites and stores the width size information corresponding to the sheet in a predetermined first storage area in the RAM 13. The first storage area is a storage area capable of storing only one piece of width size information. Note that the first storage area may be a storage area capable of storing a plurality of pieces of width size information.

The detection processing portion 52 detects the temperature of the fixing belt 41.

For example, the detection processing portion 52 detects the temperature of the fixing belt 41 using the temperature sensor 46. Note that the detection processing portion 52 may detect the temperature of the fixing belt 41 using a sensor capable of detecting the temperature of the fixing belt 41.

In a case in which the image forming process for forming an image on a sheet is executed, the determination processing portion 53 uses the width size information last stored in the RAM 13 to determine whether or not the temperature lowering process for lowering the temperature of the fixing belt 41 is required.

For example, in a case in which both a size condition and a temperature condition are satisfied, the determination processing portion 53 determines that the temperature lowering process is necessary. In addition, the determination processing portion 53 determines that the temperature lowering process is unnecessary when either one or both of the size condition and the temperature condition are not satisfied.

Here, the size condition is that the size in the width direction of the sheet on which an image is to be formed next is larger than the size in the width direction of the sheet on which an image was previously formed.

In addition, the temperature condition is that the temperature of the fixing belt 41 detected by the detection processing portion 52 exceeds a predetermined threshold value. That is, in a case in which the temperature of the fixing belt 41 detected by the detection processing portion 52 is equal to or lower than the threshold value, the determination processing portion 53 determines that the temperature lowering process is unnecessary.

For example, the temperature lowering process is a process in which execution of the image forming process is restricted and driving of the heater 42 is stopped while the motor 47 is driven to rotate the fixing belt 41 and the pressure roller 45. Note that the temperature lowering process may be a process in which execution of the image forming process is restricted and the drive of the heater 42 is stopped, and a cooling device such as a blower fan capable of cooling the fixing belt 41 is driven together with the motor 47.

Note that the determination processing portion 53 may determine that the temperature lowering process is necessary when the size condition is satisfied.

In a case in which the power supply to the RAM 13 is stopped, the second storage processing portion 54 stores the width size information last stored in the RAM 13 in the storage portion 6.

For example, in a case in which a power supply stop condition is satisfied, the second storage processing portion 54 overwrites the width size information stored in the first storage area of the RAM 13 into a predetermined second storage area in the storage portion 6. The second storage area is a storage area capable of storing only one piece of width size information. Note that the second storage area may be a storage area capable of storing a plurality of pieces of width size information.

For example, the power supply stop condition includes a condition that a power switch of the image forming apparatus 100 is operated while the image forming apparatus 100 is in an ON state. When the power switch of the image forming apparatus 100 is operated while the image forming apparatus 100 is powered ON, the power supply to the control portion 7 including the RAM 13 is stopped.

In addition, the power supply stop condition also includes satisfying a transition condition of an operating mode of the image forming apparatus 100 transitioning from a normal mode to a power saving mode in which power consumption is reduced more than in the normal mode. In the power saving mode, power supply to the control portion 7 including the RAM 13 is stopped. For example, the transition condition includes a condition that, in a case in which the operating mode of the image forming apparatus 100 is the normal mode, a no-operation state in which the image forming apparatus 100 is not operated continues for a predetermined period of time. In addition, the transition condition also includes a condition that a predetermined operation is performed on the operation display portion 5.

In a case in which the power supply to the RAM 13 is started, the third storage processing portion 55 stores the width size information last stored in the storage portion 6 in the RAM 13.

For example, in a case in which power supply to the RAM 13 is started, the third storage processing portion 55 overwrites the width size information stored in the second storage area of the storage portion 6 into the first storage area of the RAM 13 and stores the information.

Note that in the image forming apparatus 100, in a case in which the power switch of the image forming apparatus 100 is operated while the power supply of the image forming apparatus 100 is in an OFF state, power supply to the control portion 7 including the RAM 13 is started. In addition, in the image forming apparatus 100, in a case in which the operating mode of the image forming apparatus 100 transitions from the power saving mode to the normal mode, the power supply to the control portion 7 including the RAM 13 is started. For example, in a case in which the operating mode of the image forming apparatus 100 is the power saving mode, and in a case in which a predetermined return condition is satisfied, the operating mode of the image forming apparatus 100 returns from the power saving mode to the normal mode. For example, the return condition includes that a user operation is received on the operation display portion 5. In addition, the return condition also includes a condition that an instruction to execute the image forming process is input from an external information processing apparatus.

After the width size information is stored by the third storage processing portion 55, the fourth storage processing portion 56 stores in the storage portion 6 the width size information corresponding to the size in the width direction of a specific sheet that has the smallest size in the width direction among the sheets on which an image can be formed by the image forming apparatus 100.

For example, after the width size information is stored by the third storage processing portion 55, the fourth storage processing portion 56 overwrites and stores the width size information corresponding to the size in the width direction of the specific sheet in the second memory area of the storage portion 6.

Hereinafter, a storage method according to the present disclosure will be described along with an example of a procedure of each process executed by the control portion 7.

[Image Forming Operation Control Process]

Figure 6:
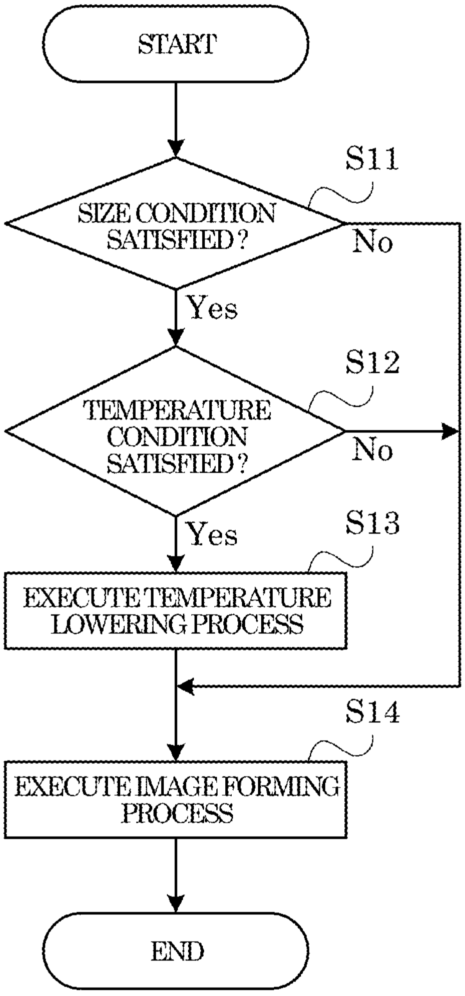
FIG. 6 is a flowchart showing an example of an image forming operation control process executed by an image forming apparatus of an embodiment according to the present disclosure.

Hereinafter, an example of a procedure of the image forming operation control process executed by the control portion 7 in the image forming apparatus 100 will be described with reference to FIG. 6. Here, steps S11, S12, . . . represent numbers of processing procedures (steps) executed by the control portion 7. Note that in a case in which an instruction to execute the image forming process is input, the control portion 7 executes the image forming operation control process.

<Step S11>

First, in step S11, the control portion 7 determines whether or not the size condition is satisfied.

More specifically, the control portion 7 determines that the size condition is satisfied in a case in which the size in the width direction of the sheet on which the next image is formed is larger than the size (the width size information) stored in the first storage area of the RAM 13.

Here, when the control portion 7 determines that the size condition is satisfied (Yes in S11), the control portion 7 causes the process to proceed to step S12. In addition, when the size condition is not satisfied (No in S11), the control portion 7 causes the process to proceed to step S14.

<Step S12>

In step S12, the control portion 7 determines whether or not the temperature condition is satisfied. The processes of steps S11 and S12 are examples of the determination steps according to the present disclosure, and are executed by the determination processing portion 53 of the control portion 7.

More specifically, the control portion 7 detects the temperature of the fixing belt 41 using the temperature sensor 46. This process is executed by the detection processing portion 52 of the control portion 7.

In a case in which the detected temperature of the fixing belt 41 exceeds the threshold value, the control portion 7 determines that the temperature condition is satisfied.

Here, when the control portion 7 determines that the temperature condition is satisfied (Yes in S12), the control portion 7 causes the process to proceed to step S13. In addition, when the temperature condition is not satisfied (No in S12), the control portion 7 causes the process to proceed to step S14.

<Step S13>

In step S13, the control portion 7 executes the temperature lowering process.

<Step S14>

In step S14, the control portion 7 executes the image forming process.

[Width Size Information Storage Process]

Figure 7:
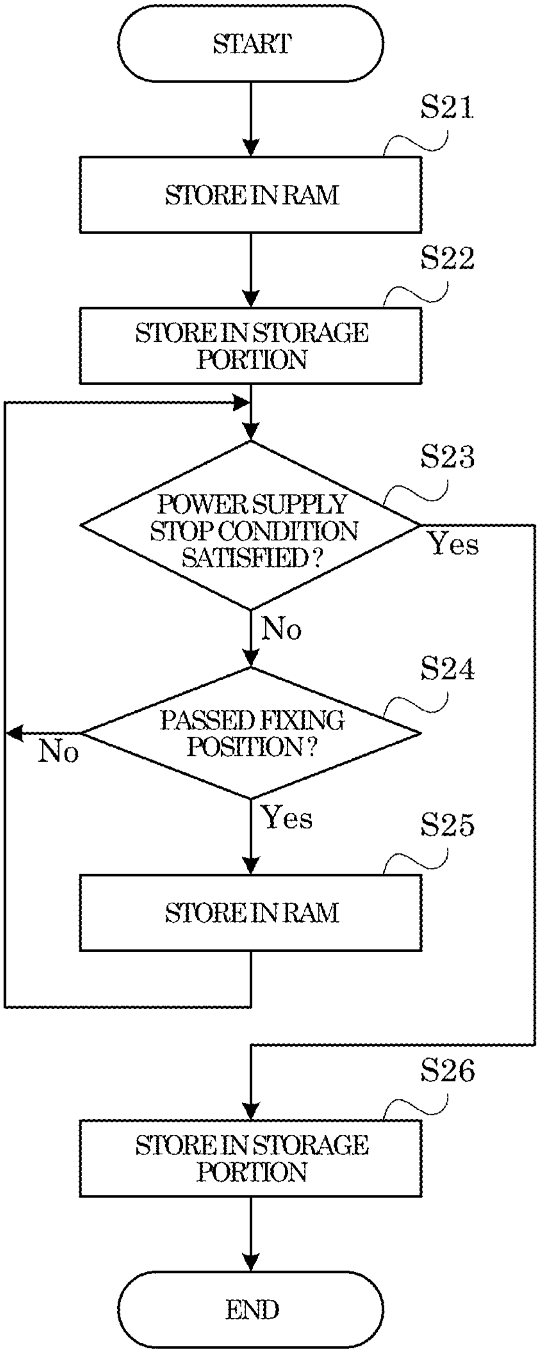
FIG. 7 is a flowchart showing an example of a width size information storage process executed by the image forming apparatus of an embodiment according to the present disclosure.

Next, an example of a procedure of a width size information storage process executed by the control portion 7 in the image forming apparatus 100 will be described with reference to FIG. 7. Note that the control portion 7 executes the width size information storage process in a case in which power supply to the image forming apparatus 100 is turned ON or in a case in which the operating mode of the image forming apparatus 100 returns from the power saving mode to the normal mode.

<Step S21>

First, in step S21, the control portion 7 stores the width size information last stored in the storage portion 6 in the RAM 13. The process of step S21 is an example of a third storage step according to the present disclosure, and is executed by the third storage processing portion 55 of the control portion 7.

More specifically, the control portion 7 overwrites and stores the width size information stored in the second storage area of the storage portion 6 into the first storage area of the RAM 13.

<Step S22>

In step S22, the control portion 7 stores the width size information corresponding to the size in the width direction of the specific sheet in the storage portion 6. The process of step S22 is an example of a fourth storage step according to the present disclosure, and is executed by the fourth storage processing portion 56 of the control portion 7.

More specifically, the control portion 7 overwrites and stores the width size information corresponding to the size in the width direction of the specific sheet in the second storage area of the storage portion 6. Thus, even in a case in which the power supply to the RAM 13 is stopped due to a power outage or the like before the width size information last stored in the RAM 13 is stored in the storage portion 6 and then the power supply to the RAM 13 is resumed, the width size information corresponding to the size in the width direction of the specific sheet is treated as the stored width size information. Therefore, it is possible to avoid a situation in which the temperature lowering process is determined to be unnecessary when the next image forming process is executed, even though the temperature lowering process is necessary. Therefore, the occurrence of the high-temperature offset can be suppressed.

<Step S23>

In step S23, the control portion 7 determines whether or not the power supply stop condition is satisfied.

More specifically, in a case in which the power switch of the image forming apparatus 100 is operated, the control portion 7 determines that the power supply stop condition is satisfied. In addition, in a case in which the transition condition is satisfied, the control portion 7 determines that the power supply stop condition is satisfied.

Here, when the control portion 7 determines that the power supply stop condition is satisfied (Yes in S23), the control portion 7 causes the process to proceed to step S26. In addition, when the power supply stop condition is not satisfied (No in S23), the control portion 7 causes the process to proceed to step S24.

<Step S24>

In step S24, the control portion 7 determines whether or not the sheet has passed the fixing position P2 (see FIG. 4).

Here, when the control portion 7 determines that the sheet has passed the fixing position P2 (Yes in S24), the control portion 7 causes the process to proceed to step S25. In addition, when the sheet has not passed the fixing position P2 (No in S24), the control portion 7 causes the process to proceed to step S23.

<Step S25>

In step S25, the control portion 7 stores in the RAM 13 the width size information corresponding to the sheet that has passed the fixing position P2. The process of step S25 is an example of a first storage step according to the present disclosure, and is executed by the first storage processing portion 51 of the control portion 7.

More specifically, the control portion 7 overwrites and stores the width size information corresponding to the sheet that has passed the fixing position P2 in the first storage area of the RAM 13.

<Step S26>

In step S26, the control portion 7 stores the width size information last stored in the RAM 13 in the storage portion 6. The process of step S26 is an example of a second storage step according to the present disclosure, and is executed by the second storage processing portion 54 of the control portion 7.

More specifically, the control portion 7 overwrites and stores the width size information stored in the first storage area of the RAM 13 into the second storage area of the storage portion 6.

In this way, in the image forming apparatus 100, power supply to the RAM 13 is started, and the width size information last stored in the storage portion 6 is stored in the RAM 13, and then the width size information corresponding to the size in the width direction of the specific sheet is stored in the storage portion 6. Thus, even in a case in which the power supply to the RAM 13 is stopped due to a power outage or the like before the width size information last stored in the RAM 13 is stored in the storage portion 6 and then the power supply to the RAM 13 is resumed, the width size information corresponding to the size in the width direction of the specific sheet is treated as the stored width size information. Therefore, it is possible to avoid a situation in which the temperature lowering process is determined to be unnecessary when the next image forming process is executed, even though the temperature lowering process is necessary. Therefore, the occurrence of the high-temperature offset can be suppressed.

[Supplementary Notes]

Hereinafter, an outline of the invention extracted from the above-described embodiments will be added. Note that the configurations and processing functions described in the following supplementary notes can be selected and combined as desired.

<Supplementary Note 1>

An image forming apparatus, including:

a fixing portion configured to fix a toner image transferred onto a sheet to the sheet;

a first storage processing portion configured to store in a volatile first storage portion width size information corresponding to a size in a width direction of a sheet perpendicular to a conveying direction of the sheet after the sheet has passed a fixing position of the toner image by the fixing portion;

a determination processing portion configured to, using the width size information last stored in the first storage portion, determine, in a case in which an image forming process for forming an image on the sheet is executed, whether or not a temperature lowering process for lowering a temperature of the fixing portion is necessary;

a second storage processing portion configured to, in a case in which power supply to the first storage portion is stopped, store the width size information last stored in the first storage portion in a non-volatile second storage portion;

a third storage processing portion configured to, in a case in which power supply to the first storage portion is started, store, in the first storage portion, the width size information that was last stored in the second storage portion; and a fourth storage processing portion configured to, after the width size information is stored by the third storage processing portion, store, in the second storage portion, the width size information corresponding to the size in the width direction of the sheet having a minimum size in the width direction among the sheets on which an image can be formed by the image forming apparatus.

<Supplementary Note 2>

The image forming apparatus according to Supplementary Note 1, wherein the first storage processing portion stores the width size information in the first storage portion every time the sheet passes the fixing position.

<Supplementary Note 3>

The image forming apparatus according to Supplementary Notes 1 or 2, including a detection processing portion configured to detect the temperature of the fixing portion, wherein the determination processing portion, in a case in which a temperature of the fixing portion detected by the detection processing portion is equal to or lower than a predetermined threshold value, determines that the temperature lowering process is unnecessary.

<Supplementary Note 4>

A storage method executed by an image forming apparatus including a fixing portion that fixes a toner image transferred onto a sheet to the sheet;

the storage method, including:

a first storage step of storing in a volatile first storage portion width size information corresponding to a size in a width direction of a sheet perpendicular to a conveying direction of the sheet after the sheet has passed a fixing position of the toner image by the fixing portion;

a determination step of, in a case in which an image forming process for forming an image on the sheet is executed, determining whether or not a temperature lowering process for lowering a temperature of the fixing portion is necessary, using the width size information last stored in the first storage portion;

a second storage step of, in a case in which power supply to the first storage portion is stopped, storing the width size information last stored in the first storage portion in a non-volatile second storage portion;

a third storage step of, in a case in which power supply to the first storage portion is started, storing, in the first storage portion, the width size information that was last stored in the second storage portion; and a fourth storage step of, after the width size information is stored by the third storage processing portion, storing, in the second storage portion, the width size information corresponding to the size in the width direction of the sheet having a minimum size in the width direction among the sheets on which an image can be formed by the image forming apparatus.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

a fixing portion configured to fix a toner image transferred onto a sheet to the sheet;

a first storage processing portion configured to store in a volatile first storage portion width size information corresponding to a size in a width direction of a sheet perpendicular to a conveying direction of the sheet after the sheet has passed a fixing position of the toner image by the fixing portion;

a determination processing portion configured to, using the width size information last stored in the first storage portion, determine, in a case in which an image forming process for forming an image on the sheet is executed, whether or not a temperature lowering process for lowering a temperature of the fixing portion is necessary;

a second storage processing portion configured to, in a case in which power supply to the first storage portion is stopped, store the width size information last stored in the first storage portion in a non-volatile second storage portion;

a third storage processing portion configured to, in a case in which power supply to the first storage portion is started, store, in the first storage portion, the width size information that was last stored in the second storage portion; and a fourth storage processing portion configured to, after the width size information is stored by the third storage processing portion, store, in the second storage portion, the width size information corresponding to the size in the width direction of the sheet having a minimum size in the width direction among the sheets on which an image can be formed by the image forming apparatus.

2. The image forming apparatus according to claim 1, wherein the first storage processing portion stores the width size information in the first storage portion every time the sheet passes the fixing position.

3. The image forming apparatus according to claim 1, comprising a detection processing portion configured to detect the temperature of the fixing portion, wherein the determination processing portion, in a case in which a temperature of the fixing portion detected by the detection processing portion is equal to or lower than a predetermined threshold value, determines that the temperature lowering process is unnecessary.

4. A storage method executed by an image forming apparatus including a fixing portion that fixes a toner image transferred onto a sheet to the sheet;

the storage method comprising:

a first storage step of storing in a volatile first storage portion width size information corresponding to a size in a width direction of a sheet perpendicular to a conveying direction of the sheet after the sheet has passed a fixing position of the toner image by the fixing portion;

a determination step of, in a case in which an image forming process for forming an image on the sheet is executed, determining whether or not a temperature lowering process for lowering a temperature of the fixing portion is necessary, using the width size information last stored in the first storage portion;

a second storage step of, in a case in which power supply to the first storage portion is stopped, storing the width size information last stored in the first storage portion in a non-volatile second storage portion;

a third storage step of, in a case in which power supply to the first storage portion is started, storing, in the first storage portion, the width size information that was last stored in the second storage portion; and a fourth storage step of, after the width size information is stored by the third storage processing portion, storing, in the second storage portion, the width size information corresponding to the size in the width direction of the sheet having a minimum size in the width direction among the sheets on which an image can be formed by the image forming apparatus.

* * * * *